(12) United States Patent
Jones et al.

(10) Patent No.: US 10,724,888 B2
(45) Date of Patent: Jul. 28, 2020

(54) CONTAINER CAPACITY MEASUREMENT SYSTEM

(71) Applicant: Walmart Apollo, LLC, Bentonville, AR (US)

(72) Inventors: Nicholaus Adam Jones, Fayetteville, AR (US); Matthew Allen Jones, Bentonville, AR (US); Aaron Vasgaard, Fayetteville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 116 days.

(21) Appl. No.: 15/923,416

(22) Filed: Mar. 16, 2018

(65) Prior Publication Data

US 2018/0266869 A1    Sep. 20, 2018

Related U.S. Application Data

(60) Provisional application No. 62/472,314, filed on Mar. 16, 2017.

(51) Int. Cl.
*G01F 17/00* (2006.01)

(52) U.S. Cl.
CPC .................... *G01F 17/00* (2013.01)

(58) Field of Classification Search
CPC .......................................... G01F 17/00
USPC ........................................... 73/149
See application file for complete search history.

(56) References Cited

U.S. PATENT DOCUMENTS

| 1,585,563 A | 5/1926 | Schlattau |
| 1,709,139 A * | 4/1929 | Manchester ............. G01N 9/14 |
| | | 73/445 |
| 3,157,953 A | 11/1964 | Brier |
| 3,224,102 A | 12/1965 | MacMillan |

(Continued)

FOREIGN PATENT DOCUMENTS

| CA | 2995272 A1 * | 2/2017 | ............. B65D 90/48 |
| DE | 102010032123 A1 | 1/2012 | |
| WO | 2015023114 A1 | 2/2015 | |

OTHER PUBLICATIONS

International Search Report and Written Opinion for Application No. PCT/US2018/022896, dated May 31, 2018. 9 pages.

(Continued)

*Primary Examiner* — Marrit Eyassu
(74) *Attorney, Agent, or Firm* — McCarter & English, LLP; David R. Burns (57) ABSTRACT

Exemplary embodiments of the present disclosure are directed to a system for measuring the capacity of a container. The system includes a variable scale disposed near or within the interior wall of the container with elongated body formed by an adjustable shaft including a number of visual indicators. The visual indicators are representative of a capacity of the container, and sliding the adjustable shaft adjusts an amount of space between each of the visual indicators. The system also includes a measuring arm extending from one end of the adjustable shaft and configured to rotate around an axis of rotation from a locked position, in which adjustment of the adjustable shaft is prevented, to a movable position, in which adjustment of the adjustable shaft is permitted. The measuring arm can be used to expand or compress the adjustable shaft, along with the spaces between the visual indicators.

20 Claims, 6 Drawing Sheets

(56) References Cited

U.S. PATENT DOCUMENTS

| | | | |
|---|---|---|---|
| 3,672,061 A | 6/1972 | Alessi | |
| 4,335,609 A | 6/1982 | Saulsbury | |
| 4,400,881 A | 8/1983 | Boudin et al. | |
| 5,053,009 A * | 10/1991 | Herzberg | A61B 1/00085 604/104 |
| 5,390,824 A * | 2/1995 | Vassiliou | A47G 19/18 222/133 |
| 6,408,694 B1 * | 6/2002 | Lin | G01N 9/12 73/444 |
| 7,076,881 B1 | 7/2006 | Perry | |
| 7,444,751 B1 | 11/2008 | Slye et al. | |
| 7,778,855 B2 | 8/2010 | Holliday | |
| 7,996,256 B1 | 8/2011 | Anand et al. | |
| 8,021,158 B2 | 9/2011 | Eras et al. | |
| 9,335,144 B2 | 5/2016 | Wagstaff et al. | |
| 2005/0109104 A1 * | 5/2005 | Fling | G01F 23/0046 73/305 |
| 2006/0160484 A1 | 7/2006 | Falk | |
| 2009/0291627 A1 | 11/2009 | Zimmermann et al. | |
| 2011/0173082 A1 | 7/2011 | Breitenbach et al. | |
| 2017/0363457 A1 * | 12/2017 | Alam | G01F 19/00 |

OTHER PUBLICATIONS

Biddle Climate Solutions, "Comfort air curtains Model CA2" [online]. https://www.master.ca/documents/regroupements/CA2.CAN_en.pdf [retrieved 2017] Retrieved from the internet: <URL: https://www.master.ca/documents/regroupements/CA2.CAN_en.pdf>.

Smith, Kennedy, Height Cages: A Stand-Up Solution, Quality Digest Magazine, http://www.qualitydigest.com/sept02/articles/01_article.shtml, Jul. 27, 2016.

Stanley No. 69 folding ruler pocket vintage and 50 similar items, Bonanza. https://www.bonanza.com/items/like/21706147/StanleyNo69foldingrulerpocketvintagecarpentermeasuringtool, last viewed Jul. 27, 2016.

Mint and Rare! Stanley No. 4 Boxwood 2 Foot 2 Fold Extra-Thin Carpenter's Rule with Drafting Scales, www.JimBodeTools.com, http://www.jimbodetools.com/MintandRareSTANLEYNo4Boxwood2Foot2FoldExtraThinCarpentersRulewithDraftingScalesp39710.html, last viewed Jul. 27, 2016.

* cited by examiner

CONTAINER CAPACITY MEASUREMENT SYSTEM

RELATED APPLICATIONS

This application claims priority to U.S. Provisional Patent Application No. 62/472,314 entitled "CONTAINER CAPACITY MEASUREMENT SYSTEM," filed on Mar. 16, 2017, the content of which is hereby incorporated by reference in its entirety.

BACKGROUND

Challenges arise when determining the capacity level of conventional containers for storing objects. Additionally, individuals may be required to perform mathematical calculations in order to determine the capacity level of conventional containers.

SUMMARY

Embodiments of the present invention utilize a variable scale disposed within an interior wall of a container to indicate the capacity level of the container. In accordance with embodiments of the present disclosure, a system for measuring the capacity of a container includes a container configured to receive objects within an interior space defined by an interior wall. The system also includes a variable scale disposed proximate to the interior wall of the container and having an elongated body formed by an adjustable shaft including a plurality of visual indicators. The visual indicators are representative of a capacity of the container, and sliding a first terminal end of the adjustable shaft adjusts an amount of space between each of the visual indicators. The system also includes a measuring arm extending from the first terminal end of the adjustable shaft and configured to rotate around an axis of rotation from a locked position, in which adjustment of the adjustable shaft is prevented, to a movable position, in which adjustment of the adjustable shaft is permitted. The measuring arm is configured to slide with the first terminal end of the adjustable shaft in a direction parallel to the axis of rotation when the measuring arm is in the movable position. The system also includes a number of slots defined within the interior wall of the container and configured to receive the measuring arm when the measuring arm is in the locked position.

In accordance with other embodiments, method for measuring the capacity of a container includes rotating a measuring arm of a variable scale around an axis of rotation from a locked position to a movable position. The measuring arm extends from a first terminal end of an adjustable elongated shaft of the variable scale, and the variable scale is disposed within or near an interior wall of the container. The method also includes sliding the measuring arm with the first terminal end of the adjustable shaft in a direction parallel to the axis of rotation when the measuring arm is in the movable position. The method also includes mechanically adjusting an amount of space between each of a plurality of visual indicators of the variable scale in response to sliding the measuring arm with the first terminal end of the adjustable shaft. The method also includes positioning the measuring arm in a locked position within one of a plurality of slots defined within the interior wall of the container. When the measuring arm is in the locked position, adjustment of the adjustable elongated shaft of the variable scale being prevented.

In accordance with other embodiments, a system for measuring the capacity of a container includes a variable measuring device including a variable scale disposed proximate to an interior wall of a container. The variable scale has an elongated body formed by an adjustable shaft and includes a plurality of visual indicators representative of a capacity of the container. Sliding a first terminal end of the adjustable shaft adjusts an amount of space between each of the plurality of visual indicators. The variable scale also includes a measuring arm extending from the first terminal end of the adjustable shaft and configured to rotate around an axis of rotation from a locked position, in which adjustment of the adjustable shaft is prevented, to a movable position, in which adjustment of the adjustable shaft is permitted. The measuring arm is configured to slide with the first terminal end of the adjustable shaft in a direction parallel to the axis of rotation when the measuring arm is in the movable position. The system also includes a computing system configured to receive data representative of the capacity level of the container and estimate a weight corresponding to the container based, at least in part, on a density of the objects within the container and a capacity level of the container.

DETAILED DESCRIPTION

Exemplary embodiments of the present disclosure are directed to a system for measuring the capacity of a container. For example, embodiments of the present disclosure provide for a variable scale that facilitates determining the capacity of a container. Certain objects, such as different types of produce, may have different sizes and densities based on the weather, time of year, origin location, etc. Thus, twenty pounds of apples, for example, can fill up a container to different levels based on the time of year, weather, origin location, etc. Exemplary embodiments of the measurement system disclosed herein include a variable scale that can indicate whether a container is, for example, at ¾ capacity, ½ capacity, or ¼ capacity, regardless of the density of the objects within the container. For example, if a container is configured to hold 20 pounds of objects, the volume of the objects in the container when it is at capacity will vary depending on the density of the objects. The measurement tool described herein can be set initially when the container is at full capacity and provide indications of the capacity of the container as objects are removed.

In exemplary embodiments, the variable scale includes a number of visual indicators that are representative of the capacity of the container, and the location of these visual indicators can be adjusted as the length of the variable scale changes. For example, the variable scale can have an adjustable elongated shaft that has a number of visual indicators on its exterior, and this adjustable shaft can be fixed at one end to or incorporated within a side wall of the container. A measuring arm can be fixed to one end of the adjustable shaft, and this measuring arm can be perpendicular to the adjustable shaft and configured to rotate around an axis of rotation substantially parallel to the length of the adjustable shaft. In one example embodiment, when the measuring arm is rotated toward the side wall of the container, it can fit within a slot in the wall of the container and hold the variable scale in a locked position such that the adjustable shaft cannot extend or contract in length. In the locked position, each of the visual indicators are stationary with respect to each other and the spaces between each visual indicator remain constant. When the measuring arm is rotated away from the side wall of the container, the variable scale is in a movable position and the length of the adjustable shaft can expand and contract as the measuring arm slides along a path parallel to its axis of rotation. In some embodiments, the measuring arm can be adjusted such that it matches the height of the objects within the container and a visual indicator at the top of the adjustable shaft near the measuring arm indicates the height of the objects when the container is at capacity. In exemplary embodiments, the container is at capacity when it is holding a predetermined weight of objects, regardless of the density or volume of the products. For example, a container that is suitable for holding 20 pounds of produce will be at capacity when it holds 20 pounds of produce, regardless of the level to which this produce fills the container. Thus, a container that is at capacity with more dense products will hold less volume than a container that is at capacity with less dense products. As the adjustable shaft expands and contracts, the spaces between the visual indicators also expand and contract such that the spaces between each visual indicator remain constant. As the adjustable shaft moves, the indicators move in unison and remain equally distant from one another. The positioning of the visual indicators can be implemented using, for example, a number of linked or interlocking segments, a spring mechanism, a number of telescoping cylindrical shaft segments, etc.

In exemplary embodiments, once the measuring arm is aligned with the height of the objects in the container, the measuring arm can be rotated back into the locked position, thus fixing the visual indicators in place with the top visual indicator aligned with the height of the objects in the container. As the objects within the container are removed, the other visual indicators on the adjustable shaft become visible and can show when the container is at ¾ capacity, ½ capacity, ¼ capacity, etc. In other embodiments, the visual indicators can indicate when the container is at ⅔ capacity or ⅓ capacity, and can indicate any other suitable fraction of the capacity of the container.

Figure 1:
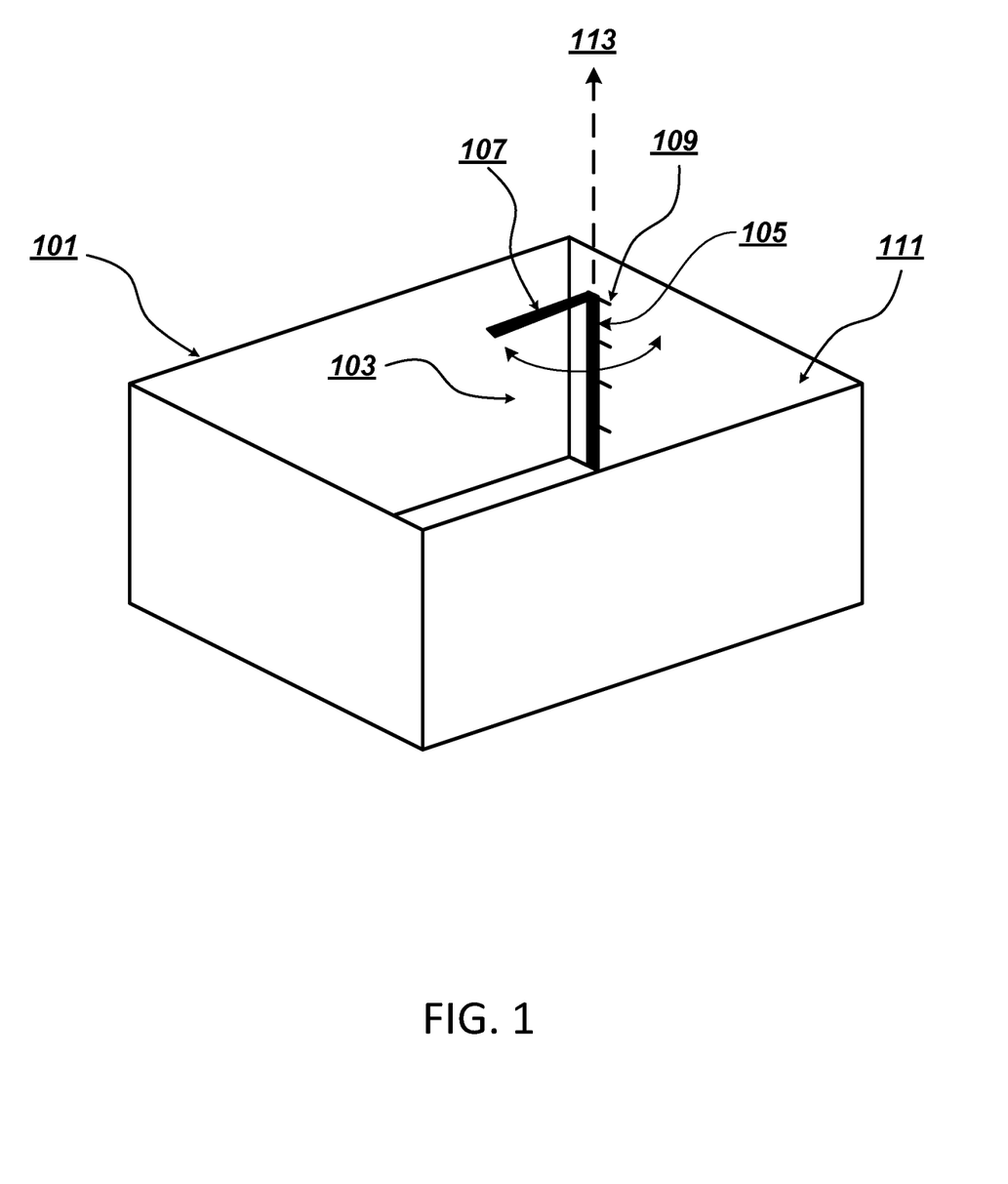
FIG. 1 is a perspective view of a container with a variable measuring device, in accordance with embodiments of the present disclosure.

FIG. 1 is a perspective view of a container 101 with a variable scale 103, in accordance with embodiments of the present disclosure. In this exemplary embodiment, the variable scale 103 includes a measuring arm 107 extending from one end of an adjustable shaft 105. The variable scale 103 also includes a number of visual indicators 109 along the length of the adjustable shaft 105 that are representative of the capacity of the container 101. In exemplary embodiments, the variable scale 103 is positioned on or within a side wall 111 of the container 101. The measuring arm 107 can rotate away from the side wall 111 around an axis of rotation 113 into a movable position that allows the measuring arm 107 to extend and adjust the length of the adjustable shaft 105. In some embodiments, the measuring arm 107 can be rotated flush with a surface of the side wall 111 into a locked position in which adjustment of the length of the adjustable shaft 105 is prevented. When positioned in the movable position, the measuring arm 107 can be used to slide one end of the adjustable shaft 105 up or down, in a direction parallel to the axis of rotation 113, to extend or compress the overall length of the variable scale 103. In one exemplary embodiment, the variable scale 103 is configured such that when the measuring arm 107 extends or compresses the length of the adjustable shaft 105, the amount of space between each of the visual indicators 109 is extended or compressed accordingly.

In exemplary embodiments, objects can be placed within the container 101 when the measuring arm 107 is in the locked position and flush with the side wall 111. Once the desired amount of objects are placed within the container 101, the measuring arm 107 can rotate around the axis 113 into the movable position, and the measuring arm 107 can adjust the length of the adjustable shaft 105 such that the measuring arm 107 reaches the height of the objects within the container 101. As discussed above, the visual indicators 109 of the adjustable shaft 105 can also adjust as the measuring arm 107 slides up or down, so that the top-most visual indicator 109 matches the height of the objects within the container 101. As the objects are removed from the container 101, the remaining visual indicators 109 show when the container 101 is at ¾ capacity, ½ capacity, or ¼ capacity, in this particular embodiment.

Figure 2:
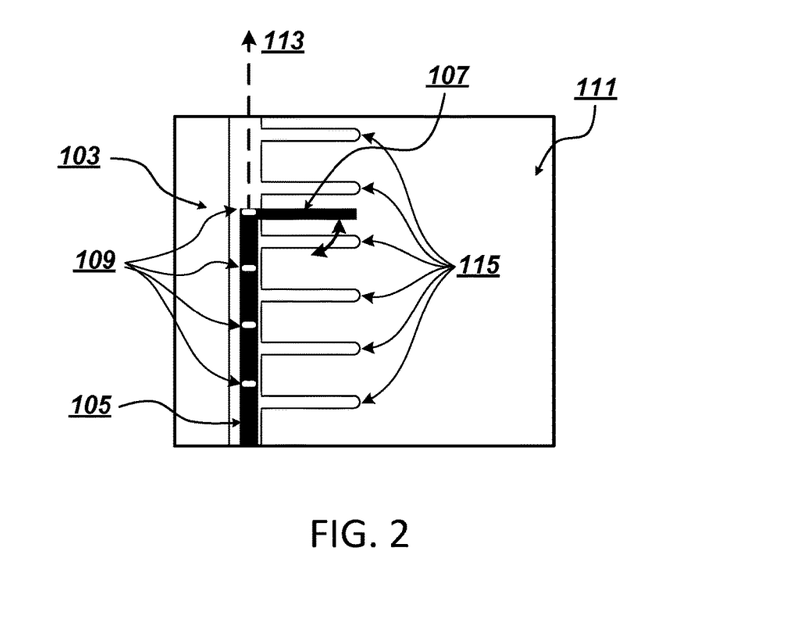
FIG. 2 is a cross sectional view of a container with a variable measuring device with a measuring arm in a movable position, in accordance with embodiments of the present disclosure.

FIG. 2 is a cross sectional view of a container with the variable scale 103 with the measuring arm 107 in the movable position, in accordance with embodiments of the present disclosure. As can be seen in this example embodiment, the movable arm 107 has rotated around the axis 113 away from the side wall 111 into the movable position, in which the length of the adjustable shaft 105 can be extended or compressed. In this embodiment, the side wall 111 includes a number of slots 115 defined within the interior of the container 101 that are configured to receive the measuring arm 107 when in the locked position. In exemplary embodiments, the visual indicators 109 can include notches, hash-marks, or any other visual indication positioned along the length of the adjustable shaft 105.

Figure 3:
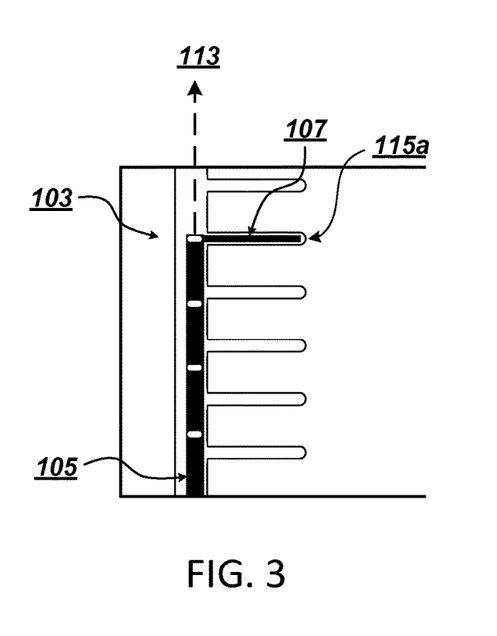
FIG. 3 is a cross sectional view of the container of FIG. 2 with the measuring arm in a locked position, in accordance with embodiments of the present disclosure.

FIG. 3 is a cross sectional view of a container showing the variable scale 103 of FIG. 2 with the measuring arm 107 in a locked position, in accordance with embodiments of the present disclosure. As can be seen in this example embodiment, the adjustable shaft 105 is extended such that the movable arm 107 matches the height of a first slot 115a within the side wall of the container, and the movable arm 107 has rotated around the axis 113 such that it fits within the first slot 115a. In this particular embodiment, there are six available slots within the side wall of the container, and the movable arm 107 is in the locked position within the second from the top slot 115a.

Figure 4:
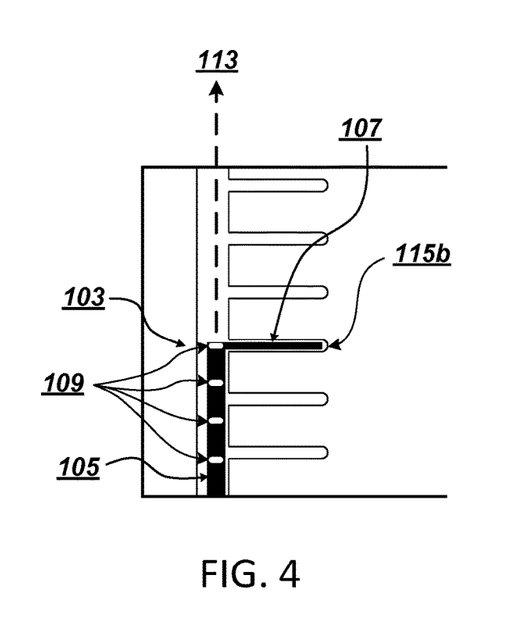
FIG. 4 is a cross sectional view of the container of FIGS. 2-3 with the measuring arm in a lower locked position, in accordance with embodiments of the present disclosure.

FIG. 4 is a cross sectional view of a container showing the variable scale 103 of FIGS. 2-3 with the measuring arm 107 in a lower locked position, in accordance with embodiments of the present disclosure. In this example embodiment, the adjustable shaft 105 is compressed, compared to the embodiment shown in FIG. 3, such that the movable arm matches the height of a second slot 115b. The movable arm 107 has rotated around the axis 113 such that it fits within the second slot 115b within the side wall of the container. There are six available slots within the side wall of the container in this embodiment, and the movable arm 107 is in the fourth from the top slot 115b. As can be seen in this example embodiment, when compared against FIG. 3, compressing the adjustable shaft 105 such that it is shorter also compresses the spaces between each of the visual indicators 109. One example mechanism for achieving this result is explained with reference to FIGS. 6-7 below. Thus, each visual indicator continues to indicate the ¼ mark, ½ mark, ¾ mark, and at-capacity mark of the length of the adjustable shaft 105 of the variable scale 103.

While FIGS. 2-4 show exemplary embodiments where the entire movable arm 107 fits within one of the slots 115, in alternative embodiments only the distal end of the movable arm 107 farthest away from the axis 113 can lock into place. In some embodiments, the distal end of the movable arm 107 can lock within a slot or groove in the side wall 111 that does not extend all the way to the axis 113 but only secures a portion of the movable arm 107.

Figure 5:
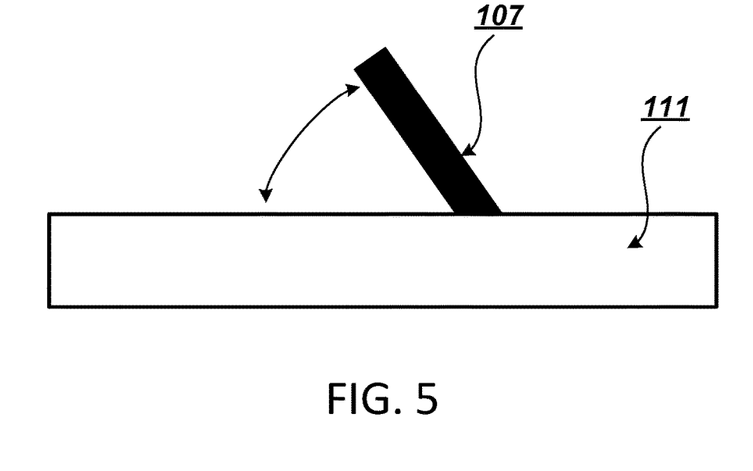
FIG. 5 is an overhead view of a measuring arm of a variable measuring device extending from a side wall of a container, in accordance with embodiments of the present disclosure.

FIG. 5 is an overhead view of the measuring arm 107 of the variable scale 103 extending from a side wall 111 of the container, in accordance with embodiments of the present disclosure. In this exemplary embodiment, the measuring arm 107 can rotate outward such that a portion of the measuring arm 107 extends away from the side wall 111 in a movable position. The measuring arm 107 can also rotate inward toward the side wall 111 such that the entirety of the measuring arm 107 is within the side wall 111 in the locked position. In some embodiments, when the measuring arm 107 is in the locked position, a portion of the measuring arm 107 is flush with an inner surface of the side wall.

Figure 6:
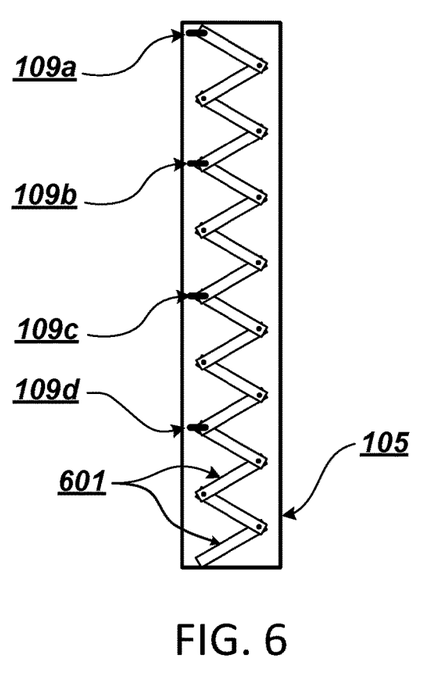
FIG. 6 depicts an internal mechanism of an adjustable shaft for a variable measuring device, in accordance with embodiments of the present disclosure.

FIG. 6 depicts an internal mechanism of the adjustable shaft 105, in accordance with embodiments of the present disclosure. In exemplary embodiments, the adjustable shaft 105 includes a number of linked segments 601 that can expand and contract along with the adjustable shaft 105. In some embodiments, the adjustable shaft 105 also includes four visual indicators 109a-109d that indicate whether the container is at capacity, at ¾ capacity, ½ capacity, or ¼ capacity. The visual indicators 109a-109d can be operatively coupled or secured to portions of the linked segments 601 such that they remain equally dispersed along the length of the adjustable shaft 105 as it is expanded and compressed, as discussed above. Thus, the distance between 109a and 109b is equal to the distance between 109b and 109c, which is equal to the distance between 109c and 109d.

Figure 7:
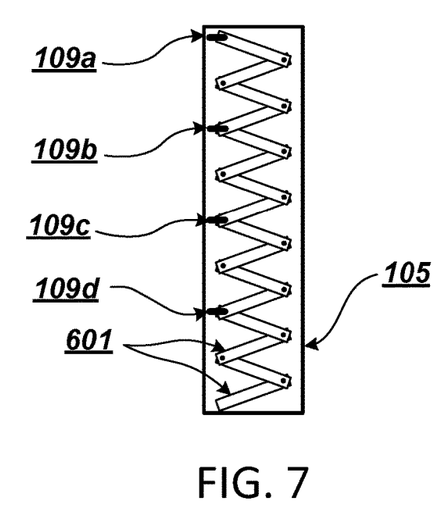
FIG. 7 depicts the adjustable shaft of FIG. 6 in a compressed position, in accordance with embodiments of the present disclosure.

FIG. 7 depicts the adjustable shaft 105 of FIG. 6 in a compressed position, in accordance with embodiments of the present disclosure. As can be seen in this example embodiment, the adjustable shaft 105 includes a number of linked segments 601 that are compressed, as compared to FIG. 6, when the adjustable shaft 105 is compressed. Because the visual indicators 109a-109d are secured to joints between the linked segments 601, in this example embodiment, the spaces between the visual indicators 109a-109d are also compressed along with the adjustable shaft 105. Thus, the distance between 109a and 109b is equal to the distance between 109b and 109c, which is equal to the distance between 109c and 109d. This configuration allows the middle visual indicator 109c to indicate the ½ capacity mark regardless of how much the adjustable shaft 105 is extended and compressed.

Figure 8:
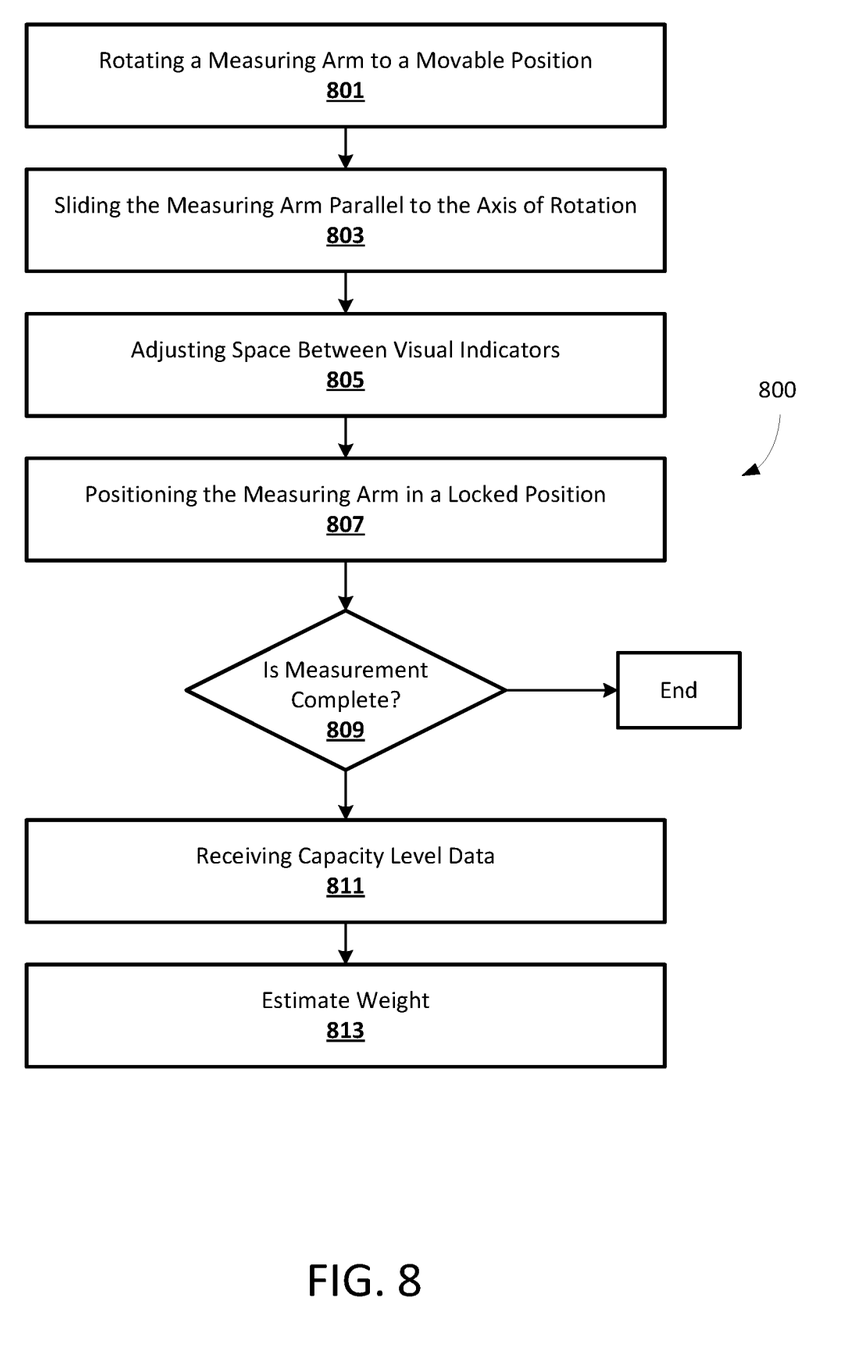
FIG. 8 is a flowchart illustrating a method for measuring the capacity of a container, in accordance with embodiments of the present disclosure.

FIG. 8 is a flowchart illustrating a method for measuring the capacity of a container, in accordance with embodiments of the present disclosure. In step 801, the measuring arm of a variable scale is rotated around an axis of rotation from a locked position, in which the adjustable shaft is prevented from moving, to a movable position in which adjustment of the adjustable shaft of the variable scale is permitted along a length of a longitudinal axis. The measuring arm extends from one terminal end of the adjustable shaft, which is disposed near or at least partially within an interior wall of the container. In some embodiments, the variable scale is integrated within the interior wall of the container.

In step 803, the measuring arm of the adjustable shaft is moved in a direction parallel to the axis of rotation. In some embodiments, the container is used to hold a predetermined weight of objects, such as produce in a supermarket, and the measuring arm is used to match the height of the objects within the container such that a visual indicator at the end of the adjustable shaft near the measuring arm marks the level of the objects when the container is at capacity. In some embodiments, the visual indicators are visible on an exterior surface of the container.

In step 805, the amount of space between a number of visual indicators on the adjustable shaft of the variable scale is mechanically adjusted, such that an equal distance is maintained between each of the visual indicators as the adjustable shaft expands or contracts. For example, the visual indicators can be coupled or secured to portions of linked segments, as shown with respect to FIGS. 6-7, such that they remain equally dispersed along the length of the adjustable shaft as it is expanded and compressed.

In step 807, the measuring arm is positioned in the locked position within one of a number of slots defined within the interior wall of the container. Once in the locked position, the length of the adjustable shaft remains constant, thus maintaining the positioning of the visual indicators of the variable scale.

After the measuring arm is positioned in the locked position, the method continues to determine whether the measurement is complete in step 809. If the measurement of the container is complete, the method then ends. If, however, the measurement is not complete, the method continues with step 811.

In step 811, a computing system receives data representative of the capacity level of the container. In exemplary embodiments, data can be provided to a capacity level module of a computing system in order to compute a weight associated with the container. In some embodiments, the data can be received manually from an individual inspecting the visual indicators on the container. In other embodiments, the variable scale may include circuitry configured to transmit data representative of the capacity level of the container.

In step 813, the computing system estimates a weight corresponding to the container using a capacity level module and based, at least in part, on a density of the objects within the container and the capacity level of the container. For example, if the container holds 20 pounds of apples when at capacity, and the variable scale indicates that the container is at capacity, the weight corresponding to the container would be 20 pounds. If, however, the variable scale indicates that the container is at about ¾ capacity, the computing system can estimate the weight of the container to be about 15 pounds.

Figure 9:
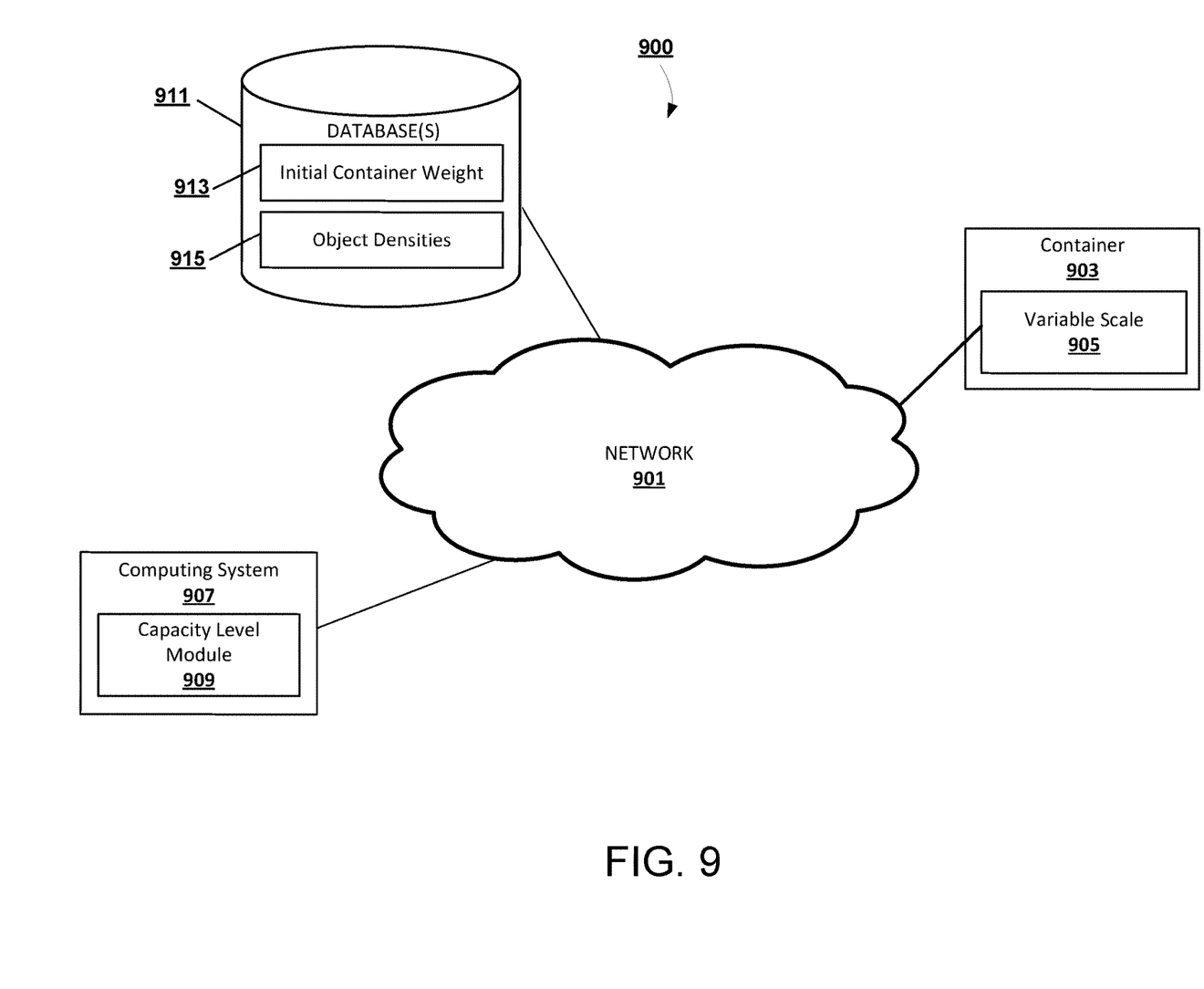
FIG. 9 is a diagram of an exemplary network environment suitable for a distributed implementation of an exemplary embodiment.

FIG. 9 illustrates a network diagram depicting a system 900 suitable for a distributed implementation of an exemplary embodiment. The system 900 can include a network 901, a variable scale 905 associated with a container 903, a computing system 907, and a database 911. As will be appreciated, various distributed or centralized configurations may be implemented without departing from the scope of the present invention. In exemplary embodiments, computing system 907 can store and execute a capacity level module 909 which can implement one or more of the processes described herein with reference to FIG. 8, or portions thereof. It will be appreciated that the module functionality may be implemented as a greater number of modules than illustrated and that the same server or computing system could also host multiple modules. The database 911 can store the initial container weight 913, the object densities 915 associated with objects within the container, etc. In some embodiments, the capacity level module 909 can communicate with circuitry associated with the variable scale 905 in order to assign and transmit delivery information and recall notifications, as described herein.

The computing system 907, circuitry associated with the variable scale 905, and database 911 may connect to the network 901 via a wired or wireless connection. In exemplary embodiments, the computing system 907, circuitry associated with the variable scale 905, and database 911 may be in communication with each other via the communication network 901. The communication network 901 may include, but is not limited to, the Internet, an intranet, a LAN (Local Area Network), a WAN (Wide Area Network), a MAN (Metropolitan Area Network), a wireless network, an optical network, and the like. In one embodiment, the computing system 907, circuitry associated with the variable scale 905, and database 911 can transmit instructions to each other over the communication network 901. In exemplary embodiments, the initial container weight 913 and object densities 915 can be stored at the database 911 and received at the computing system 907 in response to a service performed by a database retrieval application.

Figure 10:
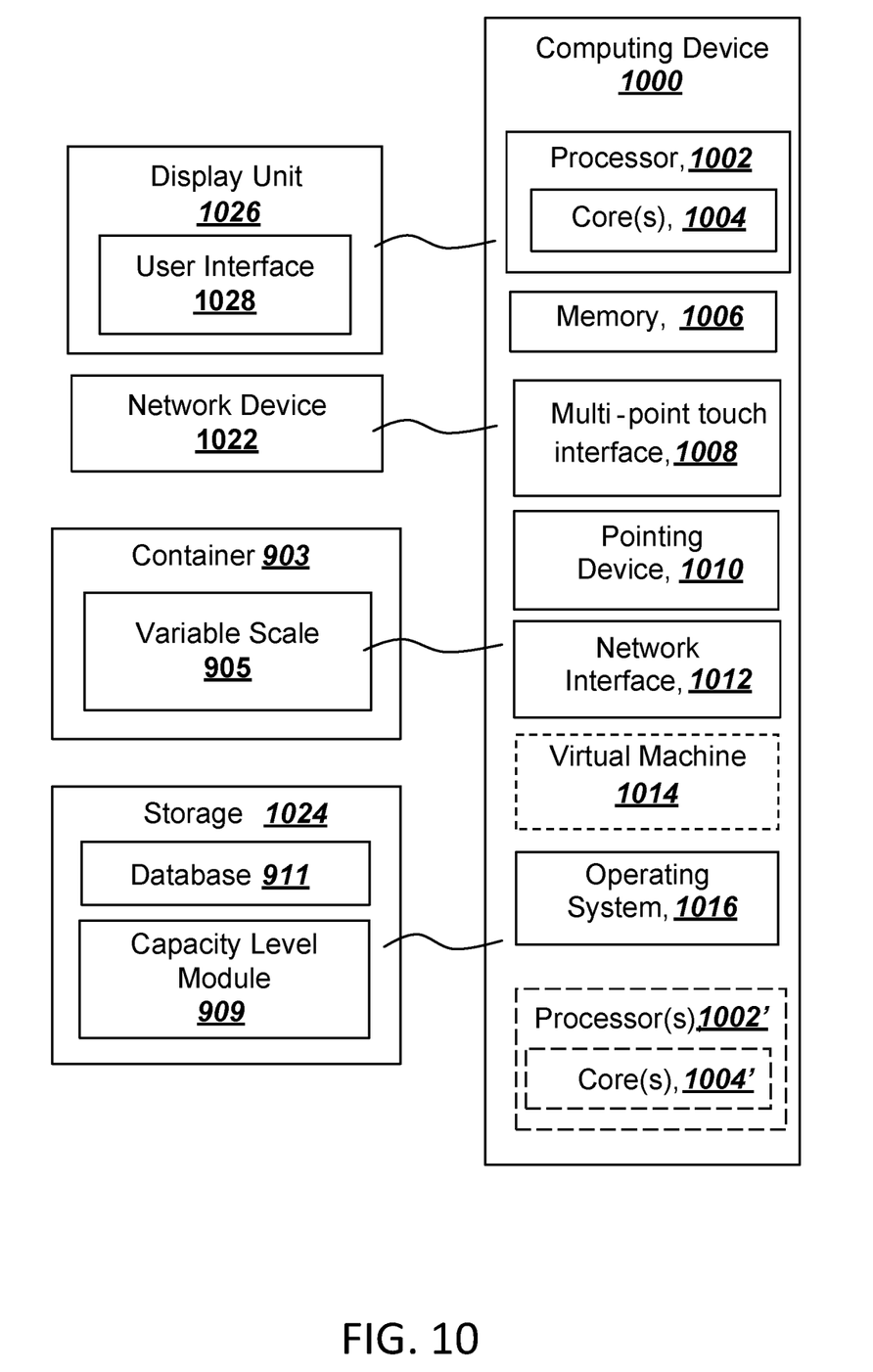
FIG. 10 is a block diagram of an exemplary computing device that can be used to perform exemplary processes in accordance with an exemplary embodiment.

FIG. 10 is a block diagram of an exemplary computing device 1000 that can be used in the performance of the methods described herein. The computing device 1000 includes one or more non-transitory computer-readable media for storing one or more computer-executable instructions (such as but not limited to software or firmware) for implementing any example method according to the principles described herein. The non-transitory computer-readable media can include, but are not limited to, one or more types of hardware memory, non-transitory tangible media (for example, one or more magnetic storage disks, one or more optical disks, one or more USB flashdrives), and the like.

For example, memory 1006 included in the computing device 1000 can store computer-readable and computer-executable instructions or software for implementing exemplary embodiments and programmed to perform processes described above in reference to FIG. 8. The computing device 1000 also includes processor 1002 and associated core 1004, and optionally, one or more additional processor(s) 1002' and associated core(s) 1004' (for example, in the case of computer systems having multiple processors/cores), for executing computer-readable and computer-executable instructions or software stored in the memory 1006 and other programs for controlling system hardware. Processor 1002 and processor(s) 1002' can each be a single core processor or multiple core (1004 and 1004') processor.

Virtualization can be employed in the computing device 1000 so that infrastructure and resources in the computing device can be shared dynamically. A virtual machine 1014 can be provided to handle a process running on multiple processors so that the process appears to be using only one computing resource rather than multiple computing resources. Multiple virtual machines can also be used with one processor.

Memory 1006 can be non-transitory computer-readable media including a computer system memory or random access memory, such as DRAM, SRAM, EDO RAM, and the like. Memory 1006 can include other types of memory as well, or combinations thereof.

A user can interact with the computing device 1000 through a display unit 1026, such as a touch screen display or computer monitor, which can display one or more user interfaces 1028 that can be provided in accordance with exemplary embodiments. The computing device 1000 can also include other I/O devices for receiving input from a user, for example, a keyboard or any suitable multi-point touch interface 1008, a pointing device 1010 (e.g., a pen, stylus, mouse, or trackpad). The multi-point touch interface 1008 and the pointing device 1010 can be coupled to the display unit 1026. The computing device 1000 can include other suitable conventional I/O peripherals.

The computing device 1000 can also include one or more storage devices 1024, such as a hard-drive, CD-ROM, or other non-transitory computer readable media, for storing data and computer-readable instructions and/or software, such as a capacity level module 909 that can implement exemplary embodiments of the methods and systems as taught herein, or portions thereof. Exemplary storage device 1024 can also store one or more databases 911 for storing any suitable information required to implement exemplary embodiments. The databases 911 can be updated by a user or automatically at any suitable time to add, delete, or update one or more items in the databases. Exemplary storage device 1024 can store one or more databases 911 for storing the initial container weight 913, object densities 915, and any other data/information used to implement exemplary embodiments of the systems and methods described herein. The computing device 1000 can also be in communication with a variable scale 905 associated with a container 903, in exemplary embodiments.

The computing device 1000 can include a network interface 1012 configured to interface via one or more network devices 1022 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. The network interface 1012 can include a built-in network adapter, network interface card, PCMCIA network card, card bus network adapter, wireless network adapter, USB network adapter, modem or any other device suitable for interfacing the computing device 1000 to any type of network capable of communication and performing the operations described herein. Moreover, the computing device 1000 can be any computer system, such as a workstation, desktop computer, server, laptop, handheld computer, tablet computer (e.g., the iPad® tablet computer), mobile computing or communication device (e.g., the iPhone® communication device), or other form of computing or telecommunications device that is capable of communication and that has sufficient processor power and memory capacity to perform the operations described herein.

The computing device 1000 can run an operating system 1016, such as versions of the Microsoft® Windows® operating systems, different releases of the Unix and Linux operating systems, versions of the MacOS® for Macintosh computers, embedded operating systems, real-time operating systems, open source operating systems, proprietary operating systems, operating systems for mobile computing devices, or other operating systems capable of running on the computing device and performing the operations described herein. In exemplary embodiments, the operating system 1016 can be run in native mode or emulated mode. In an exemplary embodiment, the operating system 1016 can be run on one or more cloud machine instances.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a multiple system elements, device components or method steps, those elements, components or steps may be replaced with a single element, component or step. Likewise, a single element, component or step may be replaced with multiple elements, components or steps that serve the same purpose. Moreover, while exemplary embodiments have been shown and described with references to particular embodiments thereof, those of ordinary skill in the art will understand that various substitutions and alterations in form and detail may be made therein without departing from the scope of the present disclosure. Further still, other aspects, functions and advantages are also within the scope of the present disclosure.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than the order shown in the illustrative flowcharts.

What is claimed is:

1. A system for measuring capacity of a container, the system comprising:
   a container configured to receive objects within an interior space defined by an interior wall;
   a variable scale disposed proximate to the interior wall of the container, the variable scale having an elongated body formed by an adjustable shaft including a plurality of visual indicators representative of a capacity of the container, wherein sliding a first terminal end of the adjustable shaft increases or decreases a length of the variable scale and adjusts an amount of space between each of the plurality of visual indicators;
   a measuring arm extending from the first terminal end of the adjustable shaft and configured to rotate around an axis of rotation from a locked position, in which adjustment of the adjustable shaft is prevented, to a movable position, in which adjustment of the adjustable shaft is permitted, wherein the measuring arm is configured to slide with the first terminal end of the adjustable shaft in a direction parallel to the axis of rotation when the measuring arm is in the movable position; and
   a plurality of slots defined within the interior wall of the container and configured to receive the measuring arm, wherein the measuring arm is in the locked position when it is disposed within one of the plurality of slots.

2. The system of claim 1, wherein the variable scale is configured to maintain an equal distance between each adjacent visual indicator.

3. The system of claim 1, wherein the variable scale is integrated within the interior wall of the container.

4. The system of claim 1, wherein the plurality of visual indicators are visible on an exterior surface of the container.

5. The system of claim 1, wherein a portion of the measuring arm is configured to be flush with the interior wall of the container when in the locked position.

6. The system of claim 1, wherein the measuring arm is prevented from sliding with the first terminal end of the adjustable shaft when in the locked position.

7. The system of claim 1, wherein the plurality of visual indicators indicate the capacity level of the container.

8. A method for measuring capacity of a container, the system comprising:
   rotating a measuring arm around an axis of rotation from a locked position to a movable position, wherein the measuring arm extends from a first terminal end of an adjustable elongated shaft of a variable scale disposed proximate to an interior wall of the container;
   sliding the measuring arm with the first terminal end of the adjustable shaft in a direction parallel to the axis of rotation, when the measuring arm is in the movable position;
   mechanically increasing or decreasing a length of the variable scale and adjusting an amount of space between each of a plurality of visual indicators of the variable scale in response to sliding the measuring arm with the first terminal end of the adjustable shaft; and
   positioning the measuring arm in a locked position within one of a plurality of slots defined within the interior wall of the container, adjustment of the adjustable elongated shaft of the variable scale being prevented in response to the measuring arm being positioned in the locked position.

9. The method of claim 8, wherein the variable scale is configured to maintain an equal distance between each adjacent visual indicator.

10. The method of claim 8, wherein the variable scale is integrated within the interior wall of the container.

11. The method of claim 8, wherein the plurality of visual indicators are visible on an exterior surface of the container.

12. The method of claim 8, wherein positioning the measuring arm in a locked position includes positioning the measuring arm such that a portion of the measuring arm is flush with the interior wall of the container.

13. The method of claim 8, wherein the measuring arm is prevented from sliding with the first terminal end of the adjustable shaft when in the locked position.

14. The method of claim 8, wherein the plurality of visual indicators indicate the capacity level of the container.

15. A system for measuring capacity of a container, the system comprising:
   a variable measuring device including:
      a variable scale disposed proximate to an interior wall of a container, the variable scale having an elongated body formed by an adjustable shaft and including a plurality of visual indicators representative of a capacity of the container, wherein sliding a first terminal end of the adjustable shaft increases or decreases a length of the variable scale and adjusts an amount of space between each of the plurality of visual indicators; and a measuring arm extending from the first terminal end of the adjustable shaft and configured to rotate around an axis of rotation from a locked position, in which adjustment of the adjustable shaft is prevented, to a movable position, in which adjustment of the adjustable shaft is permitted, wherein the measuring arm is configured to slide with the first terminal end of the adjustable shaft in a direction parallel to the axis of rotation when the measuring arm is in the movable position; and a computing system configured to receive data representative of the capacity level of the container and estimate a weight corresponding to the container based, at least in part, on a density of the objects within the container and a capacity level of the container.

16. The system of claim 15, wherein the variable measuring device further includes circuitry in communication with the computing system and configured to transmit data representative of the capacity level of the container.

17. The system of claim 15, wherein the computing system is further configured to retrieve the density of the objects within the container from a database of known densities corresponding to known objects.

18. The system of claim 15, wherein the variable scale is configured to maintain an equal distance between each adjacent visual indicator.

19. The system of claim 15, wherein the variable measuring device is integrated within the interior wall of the container.

20. The system of claim 15, wherein the interior wall of the container defines a plurality of slots configured to receive the measuring arm into a locked position.

* * * * *